Oct. 18, 1927.
L. N. WEBSTER
1,645,838
ROTATABLE PIPE JOINT
Filed Aug. 17, 1925
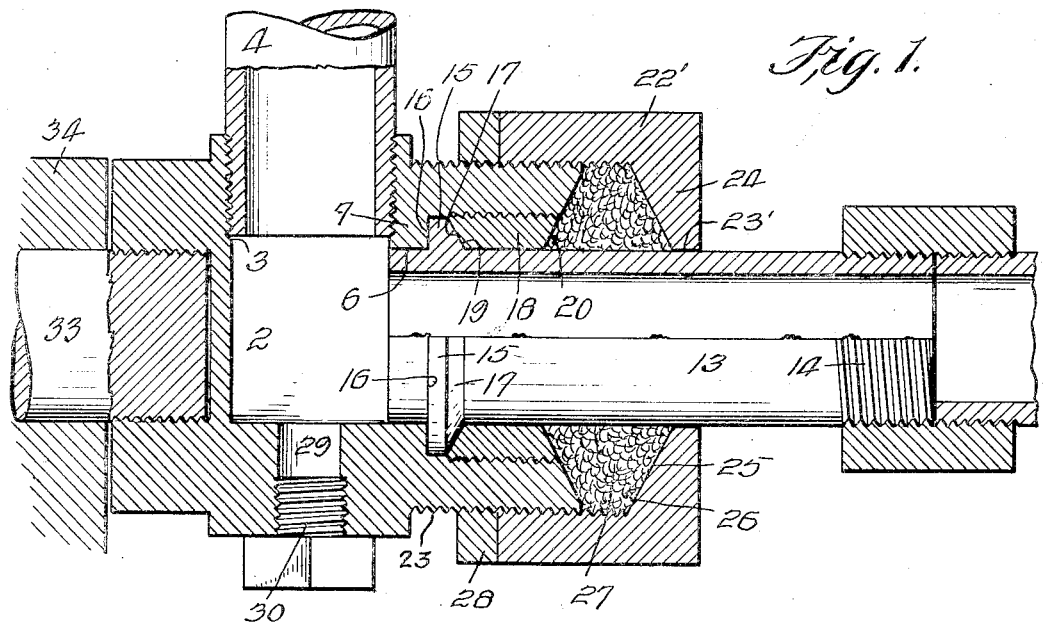
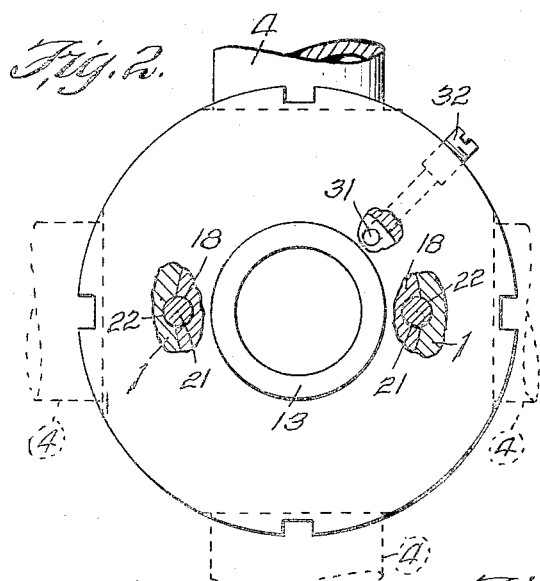
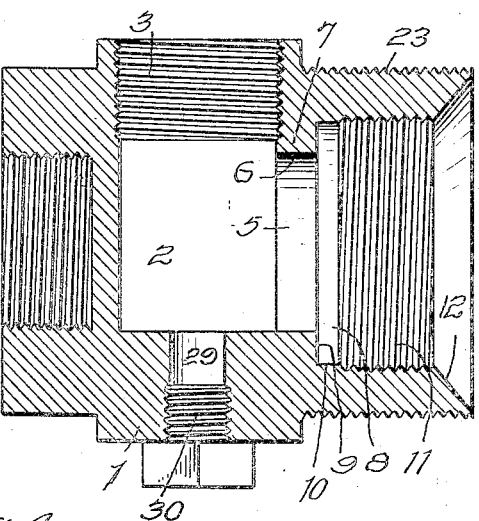
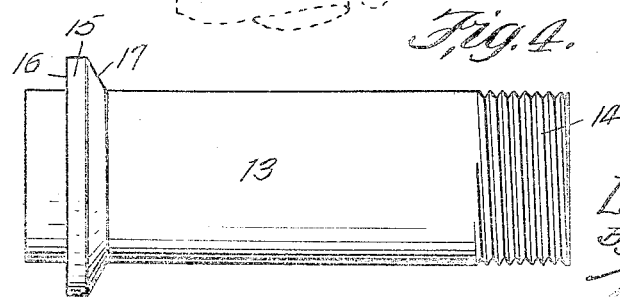
Inventor:
Leo N. Webster.
By
Attorney.

Patented Oct. 18, 1927.

1,645,838

UNITED STATES PATENT OFFICE.

LEO N. WEBSTER, OF BRENTWOOD, MISSOURI.

ROTATABLE PIPE JOINT.

Application filed August 17, 1925. Serial No. 50,629.

My invention relates to rotatable, or flexible pipe joints, or couplings, water, steam, etc., and, it is a distinct and practical improvement to overcome certain practical objections to, and defects in, the present types of flexible pipe joints.

The object of my invention is to provide a pipe joint, or coupling provided with an outlet pipe so constructed as to permit the coupling to be revolved or rotated about a feed pipe, without fear of breakage of any of the parts thereof and to prevent leakage around the feed pipe.

A further object of the invention is the provision of a rotatable pipe joint which will possess advantages in points of simplicity and efficiency, and, at the same time prove itself comparatively inexpensive in manufacture.

With the above and other objects in view, the invention consists in the novel features of construction, arrangement and combination of parts hereinafter more fully described and finally pointed out in the claims hereto appended.

Referring to the accompanying drawings forming a part of this specification wherein like characters of reference denote similar parts throughout the several views:

Fig. 1, is a sectional view of a rotatable pipe joint, or coupling constructed in accordance with my invention.

Fig. 2, is an end elevation thereof showing the delivery pipe in four different positions of a circle.

Fig. 3, is a sectional view of the body of the coupling.

Fig. 4, is a side elevation of the feed, or supply pipe forming a part of the coupling.

In carrying out the aim of my present invention, I employ a coupling body 1 having a central chamber 2 communicating with an internally screw threaded outlet opening 3 into which is screw threaded a delivery pipe 4.

Disposed at a right angle to the outlet opening 3, although not necessarily so, and communicating with the chamber 2, is an opening 5 which provides a bearing 6 in the wall 7 of the coupling body 1, as shown in Fig. 3.

Communicating with the bearing opening 5 is an opening or bore 8 which is of a larger diameter than the opening 5 thereby providing an outer ground bearing surface 9 and a right angular bearing surface 10. The bore 8 is provided with internal screw threads 11 which extend from the bearing surface 10 to the free end of the bore 8, as shown in Fig. 3. The bore 8 is beveled at its outer end to provide a packing seat 12.

The reference numeral 13 designates a supply pipe having its outer end screw threaded, as at 14. The supply pipe 13 is provided near its inner end with a peripheral flange 15 having a flat inner face 16 and a beveled outer face 17. The supply pipe extends beyond the flat front face 16 a suitable distance and it is mounted in the bearing 6 with the flat inner face of the flange 15 in contact with the outer flat face 9 of the wall 7 and the peripheral face of the flange in contact with the bearing face 10 of the bore 8. This arrangement provides an efficient bearing support for the inner end of the supply pipe, as clearly shown in Fig. 1.

A suitable bearing sleeve 18 is mounted on the supply pipe 13 and is provided with external screw threads for screw threaded connection with the internally screw threaded bore 8. The inner face 19 of the bearing sleeve is beveled for frictional and leak proof contact with the inclined outer face 17 of the flange 15, as clearly shown in Fig. 1. The outer end face of the bearing sleeve 18 is beveled, as at 20 to lie in a plane with the inclined or beveled end face of the coupling body 1, as clearly shown in Fig. 1. The bearing sleeve 18 is held from rotation after once being adjusted against the pipe flange 15 by means of a pair of dowel pins 21 which are receivable in openings 22 drilled half in the coupling body 1 and half in the bearing sleeve 18, as clearly shown in Fig. 2.

The numeral 22' designates an internally screw threaded packing gland having screw threaded connection with the external screw threads 23 of the body 1 and is provided with an opening 23' in its end wall 24 for the passage of the outer end of the supply pipe 13 which extends therebeyond, as shown in Fig. 1. The inner face of the end wall 24 of the packing gland 22 is beveled, as at 25.

A suitable packing space 26 is arranged between the outer beveled faces of the body 1 and bearing sleeve 18 and the inner beveled face of the packing gland wall 24 for the reception of a suitable packing 27, as clearly shown in Fig. 1. The packing gland 22' is held from rotary displacement after being adjusted by means of a suitable locking ring 28 which is mounted upon the external screw threaded portion of the coupling body 1, as clearly shown in Fig. 1.

The coupling body 1 is provided with a suitable drain opening 29 which communicates with the central chamber 2 of the body 1 and it is closed by means of a suitable screw plug 30.

The ground joint between the wall 7 and the supply pipe flange face 16 is lubricated through an oil passage 31 in the coupling body 1 and which is closed by means of a suitable screw plug 32.

In order to provide lubrication to the flange surfaces 16 and 17 and to the bearing surfaces 9 and 10 of the body 1, the screw plug 32 is removed and the duct filled with lubricant after which the plug 32 is again replaced.

When it is desired for any purpose to support the coupling body 1 by other and additional means than the supply pipe 13, I secure the coupling body 1 to the end of a supporting shaft or other element 33 which is rotatably mounted in a suitable bearing 34. This arrangement is not necessary in classes of work to which the device is adaptable, but where the coupling body 1 requires a more substantial support than that provided by the supply pipe nipple 13, I use a support 33, or an equivalent support for the body 1.

It is evident from the foregoing description, that my rotatable joint or coupling is not limited in its use to any particular class of work, but is capable of use in connection with the booms of steam shovels, dredges, and other apparatus having movable parts conveying steam, water, gas, oil, air, chemicals, etc., and is adapted for use in connection with laundry apparatus, packing house apparatus and in fact it is a universal leak proof joint that can be put into use wherever a flexible, swivel, or rotary joint, or coupling is required that will not leak.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the exact construction and arrangement of parts without departing from the spirit of my invention, hence I reserve the right to make any such changes, or modifications as may fairly fall within the scope of the appended claims when fairly construed.

What I claim is:

1. In a pipe coupling construction, a coupling body internally screw threaded at one end, a ground faced shoulder at the inner end of said internally screw threaded portion of the body, a bearing in advance of said shoulder, a supply pipe, a peripheral flange on said pipe having its outer face tapered, said flange having its inner face fitted for leak proof engagement with said shoulder and adapted for connection with a pipe at its outer end, the inner end of said supply pipe extending beyond the peripheral flange and receivable in said bearing, a bearing sleeve having screw threaded engagement with the coupling body and mounted upon said supply pipe, the inner face of said sleeve being tapered and embracing the tapered face of the flange, a lock pin to prevent rotary displacement of the bearing sleeve, compressible packing disposed around the supply pipe and against the end of the coupling body and said bearing sleeve, a packing gland having screw threaded engagement with the peripheral face of the coupling body and a lock nut engaging the inner face of the packing gland.

2. In a pipe coupling construction, a coupling body internally screw threaded at one end, a ground faced shoulder at the inner end of said internally screw threaded portion of the body, a bearing in advance of said shoulder, a supply pipe, a peripheral flange fitted for leak proof engagement with said shoulder and adapted for connection with a pipe at its outer end, said flange having a tapered outer face, the inner end of said supply pipe extending beyond the peripheral flange and receivable in said bearing, a bearing sleeve having screw threaded engagement with the coupling body and mounted upon said supply pipe, the inner end of the sleeve being tapered and engaging with the tapered outer face of the flange, a lock pin between the sleeve and coupling body to prevent rotary displacement of the bearing sleeve, compressible packing disposed around the supply pipe and against the end of the coupling body and said bearing sleeve, a packing gland having screw threaded engagement with the peripheral face of the coupling body, a lock nut engaging the inner face of the packing gland, said coupling body having a drain opening, a closure for said drain opening, an oil passage within the coupling body directed to the bearing face of said ground faced shoulder and a closure for said oil passage.

3. In a pipe coupling structure, a female member having an internal flange provided with a ground outer face, a bearing forming a part of said flange, internal and external screw threads for said female member, a tubular male member having a peripheral flange near its inner end and having its outer face tapered, the inner end of the male member being supported in said bearing and the flange of said male member frictionally embracing the ground face of the internal flange, a bearing sleeve engaging the internal screw threads of the female member and snugly mounted upon the male member, the inner face of the sleeve being tapered and embracing the outer tapered face of the flange of the male member, a compressible packing disposed around the male member and engaging the outer ends of the female member and the bearing sleeve, a packing gland engaging the external screw threads of the female member and the packing and a lock nut for said packing gland.

4. In a rotatable pipe coupling structure, a stationary supply pipe nipple, a peripheral flange for said nipple having a flat front face and an inclined rear face, screw threads at the outer end of said nipple for connection with a feed pipe, a coupling body having an internal flange, an internal bearing adjacent said flange to receive the inner end of the nipple, a sleeve bearing having inwardly beveled ends mounted upon the nipple and the inner end thereof engaging the inclined face of the nipple flange, means to prevent rotary displacement of the sleeve in the coupling body, a compressible packing surrounding the nipple and engaging the outer ends of the coupling body and the bearing sleeve, a packing gland having screw threaded engagement with the coupling body and a lock ring for said packing gland.

In testimony whereof, I have hereunto signed my name to the specification.

LEO N. WEBSTER.